Dec. 25, 1951  A. D. SAHLGAARD  2,579,616
AUTOMOTIVE VEHICLE BRAKING SYSTEM
Filed Dec. 20, 1946  4 Sheets-Sheet 1

INVENTOR.
Aage D. Sahlgaard
BY
Frank Schraeder
Att'y.

Dec. 25, 1951 A. D. SAHLGAARD 2,579,616
AUTOMOTIVE VEHICLE BRAKING SYSTEM
Filed Dec. 20, 1946 4 Sheets-Sheet 2
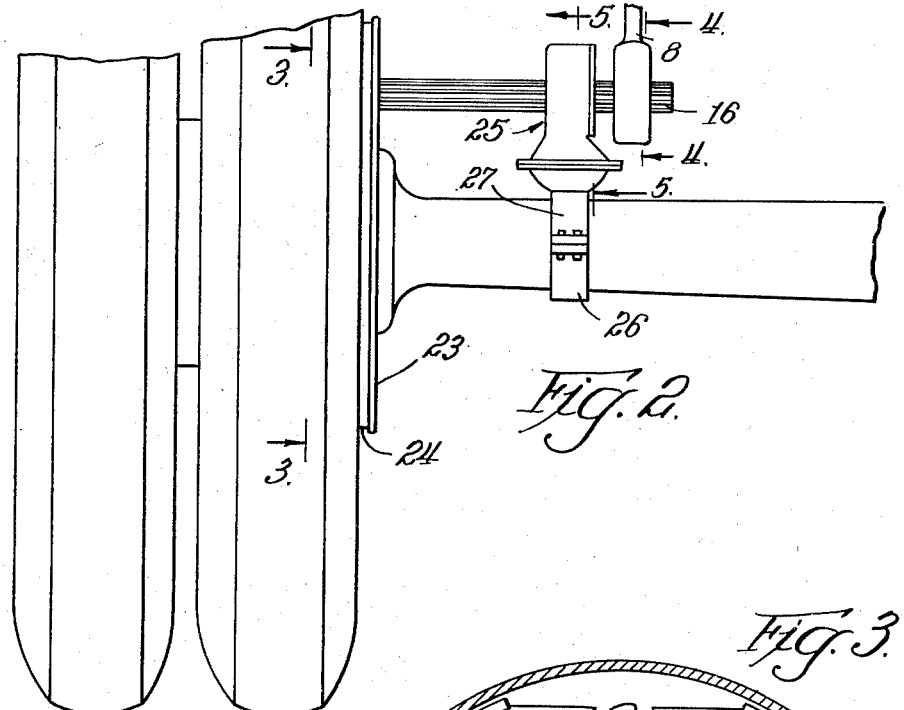
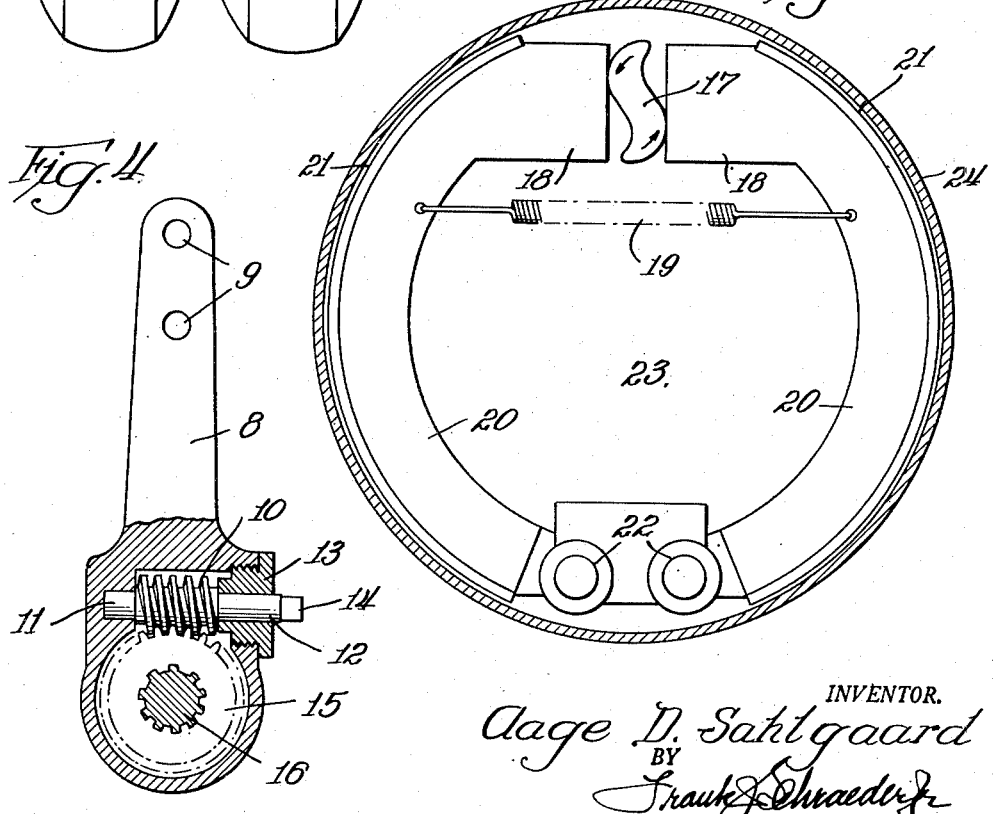
INVENTOR.
Aage D. Sahlgaard
BY Frank Schraeder Jr.
Atty.

Dec. 25, 1951     A. D. SAHLGAARD     2,579,616
AUTOMOTIVE VEHICLE BRAKING SYSTEM

Filed Dec. 20, 1946     4 Sheets-Sheet 3

INVENTOR.
Aage D. Sahlgaard
BY
Frank Schraeder
Atty

Dec. 25, 1951     A. D. SAHLGAARD     2,579,616
AUTOMOTIVE VEHICLE BRAKING SYSTEM
Filed Dec. 20, 1946     4 Sheets-Sheet 4
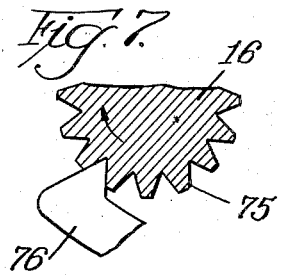
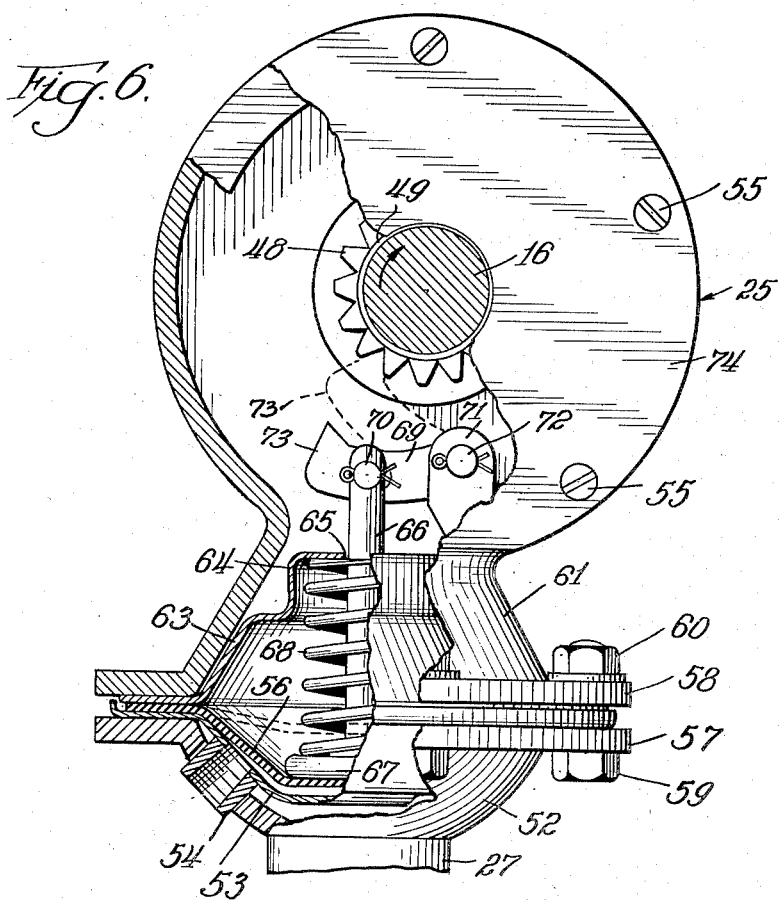
INVENTOR.
Aage D. Sahlgaard
BY Frank Schraeder Jr.
Atty.

Patented Dec. 25, 1951

2,579,616

UNITED STATES PATENT OFFICE 2,579,616

AUTOMOTIVE VEHICLE BRAKING SYSTEM

Aage D. Sahlgaard, Chicago, Ill.

Application December 20, 1946, Serial No. 717,530

1 Claim. (Cl. 188—3)

This invention pertains to new and useful improvements in braking systems for tractor-trailer combinations, buses, trucks, and similar heavy vehicles. In particular, it pertains to mechanical means cooperative with the conventional braking system for locking the brakes of equipment of the above described type under predetermined conditions. Its operation is designed to be either automatic or operator controlled. The invention is adaptable to be an integral part of the original braking system or may be added to such system as an accessory.

For better understanding of the conditions under which this invention finds use, reference first will be had to a typical tractor-trailer unit. Such a unit usually comprises a four wheel tractor, having a pair of front or steering wheels and at least one pair of rear driving wheels. The front end of the trailer body usually reposes on a so-called "fifth wheel" on which the trailer may have pivoted, tractor-following, horizontal movement. The rear end of the trailer is borne by normally freely revolving rear wheels.

A tractor-trailer unit has considerable weight in and of itself and under normal operating conditions much additional poundage is carried in the trailer. Since sufficient braking force could scarcely be built up in the tractor alone to safely and effectively control the entire vehicle, trailers now in all instances have been equipped with brakes which are controlled by the driver, for their operation making use of generally the same service brake operating means as those serving to operate the tractor brakes.

Although other systems such as electric and hydraulic are occasionally seen, the most commonly used types of braking systems for large, heavy vehicles, whether of the tractor-trailer type or conventional truck or bus type, are the so-called "air brakes" or "vacuum brakes." Air brakes rely for their actuating force upon compressed air, the compression of which is built up by well known types of compressors in driven association with the vehicle engine, the compressed air being stored in one or more suitable pressure tanks.

Vacuum brakes rely for their activating force upon the partial vacuum generated under normal operating conditions by the suction built up in the intake manifold of the vehicle engine. To maintain a continuous partially vacuous condition always ready for operation of the brakes, a vacuum reserve tank is utilized, the air in which is normally maintained in partially exhausted condition below atmospheric pressure.

In either of the above mentioned type of braking systems the foot brake pedal usually operates a valve, closing it in undepressed condition and opening it in depressed condition, the valve being so arranged in the air pressure or vacuum lines as to make accessible the air pressure or vacuum to suitable cylinders or chambers in which are positioned suitable pistons, diaphragms, or the like, the movement of which, under the force of compressed air or air pressure in the presence of a partial but sufficient vacuum, serves to operate the brake activating levers and associated mechanism. Usually as an additional safety precaution a hand operated emergency brake is provided for the tractor of a tractor-trailer combination, or for the entire braking system of a truck or bus. In some instances the emergency brake is mechanically articulated with the brake activating rods, tending to set the brakes when pulled, and operating generally through the same brake activating linkage as is operated by the piston under the pressure of compressed air or that of normal atmosphere in the presence of the built-up vacuum.

More generally, however, the emergency brakes of tractors, trucks and buses are operative only on the drive shaft of the vehicle. As indicated, the trailer of tractor-trailer units are not usually provided with mechanically operable emergency brakes but are entirely reliant on the compressed air or vacuum brake system, whichever they may have, for their brake operation. This is due to the articulated relation of the trailer and tractor which makes brake-operating mechanical connection between them very difficult to achieve.

No difficulty is encountered in providing a flexible compressed air or vacuum line hose between tractor and trailer, in communication between the tractor braking system lines and the trailer braking system lines. This is the common practice, that is to say, that the trailer is usually provided with brake operating cylinders or the like which, in road operation, are put into communication with the regular tractor brake system by being coupled thereto, the trailer brakes then being cooperatively and simultaneously operable with those of the tractor through the tractor braking system operating members.

As an additional safety factor for the trailer particularly in the event it should accidentally become detached from the tractor during operation, an emergency braking arrangement is usually provided, which generally includes a reserve compressed air or vacuum tank, and relay valve means associated therewith which keeps this brake operating force normally inoperative during effective operation of the tractor braking means, but causes the reserve of compressed air or vacuum to become immediately operative to set the brakes when the regular brake operating communication to the tractor is either accidentally or purposely broken.

When the trailer is detached from the tractor, whether purposely or accidentally, the brakes are automatically set and held in locked condition under the operative forces placed upon suitable brake operating mechanism by the reserve air pressure or vacuum in the trailer compressed air or vacuum tank. The brakes will remain locked as long as there is sufficient air pressure or vacuum in the system to maintain them in that condition. The length of time the brakes will remain locked is a variable depending much on the condition of the trailer air or vacuum lines and the condition of the brake operating cylinders. Suffice to say that the Interstate Commerce Commission has laid down rules that the brake operating system must be capable of locking the brakes of a trailer disengaged from its tractor for certain minimum periods, and, as a matter of fact, most brake systems will remain locked for considerably longer than such periods. However, under many circumstances of accident, delay, etc., this period is often insufficient, as particularly when (as often happens) a trailer must be left disengaged from its tractor for a considerable period of time. As the compressed air or vacuum is diminished due to normal leakage, this being the only means of holding the trailer brakes locked, the results can often be serious, particularly if the trailer is parked on a grade.

Referring now to the brake systems of non-trailer type heavy vehicles such as trucks, buses and the like, it is quite conventional for the air or vacuum brakes to be operated by the foot pedal and for the emergency brake to be articulated with the normally air or vacuum operated braking rods by mechanical means. In other instances, the emergency brake may have operative mechanical connection only with a brake operative on the transmission or the drive shaft. In many instances the emergency brake operating mechanism is inadequate for the stresses put upon it particularly at times when the heavy vehicle must be stopped and permitted to remain at a standstill on a severe grade, or, as another example, under conditions such as motor failure, resulting in loss of air pressure or vacuum, or other circumstance wherein constant application of the service brakes is impossible or impractical.

In view of the foregoing, the objects of the present invention are to overcome the deficiencies of the prior art by providing a device capable of installation as an accessory or as an integral part of newly manufactured equipment which, in the case of trailers of tractor-trailer equipment, will serve to automatically and continuously lock the brakes of such trailer when the trailer is detached from the tractor; and which, if desired, will act as a manually controllable brake lock, operable on the tractor alone when the trailer is disconnected therefrom or upon all the brakes of the tractor-trailer combination when the two units are connected together, supplementing the conventional tractor emergency brake equipment.

How the foregoing and other objects and advantages, apparent to those skilled in the art, are achieved is set forth in the detailed description which follows and on the drawings in which:

Fig. 2 is a fragmentary detail showing of a vehicle axle, attached wheels, a conventional brake operating shaft and lever and a typical single brake-locking device of the invention as it appears when installed in relation to the shown adjacent and cooperative parts;

Fig. 3 is a side elevation of a conventional brake drum, brake shoes and shoe activating cam, shown for better understanding of the operation of the device comprising the invention;

Fig. 4 is a side elevation, partially in section, of a conventional adjustable brake rod lever or slack adjuster which, like the showing of Fig. 3, is incorporated for greater clarity in the disclosure which follows;

Fig. 6 is a diagrammatic side elevation, partially broken and partially in section, showing a typical form of brake locking means used in conjunction with a vacuum type braking system; and Fig. 7 is a diagrammatic showing, partially in section, of a modified form of the brake actuating shaft and dog cooperative therewith, a different form of the first mentioned of which is shown in Figs. 4 and 5.

Figure 1:
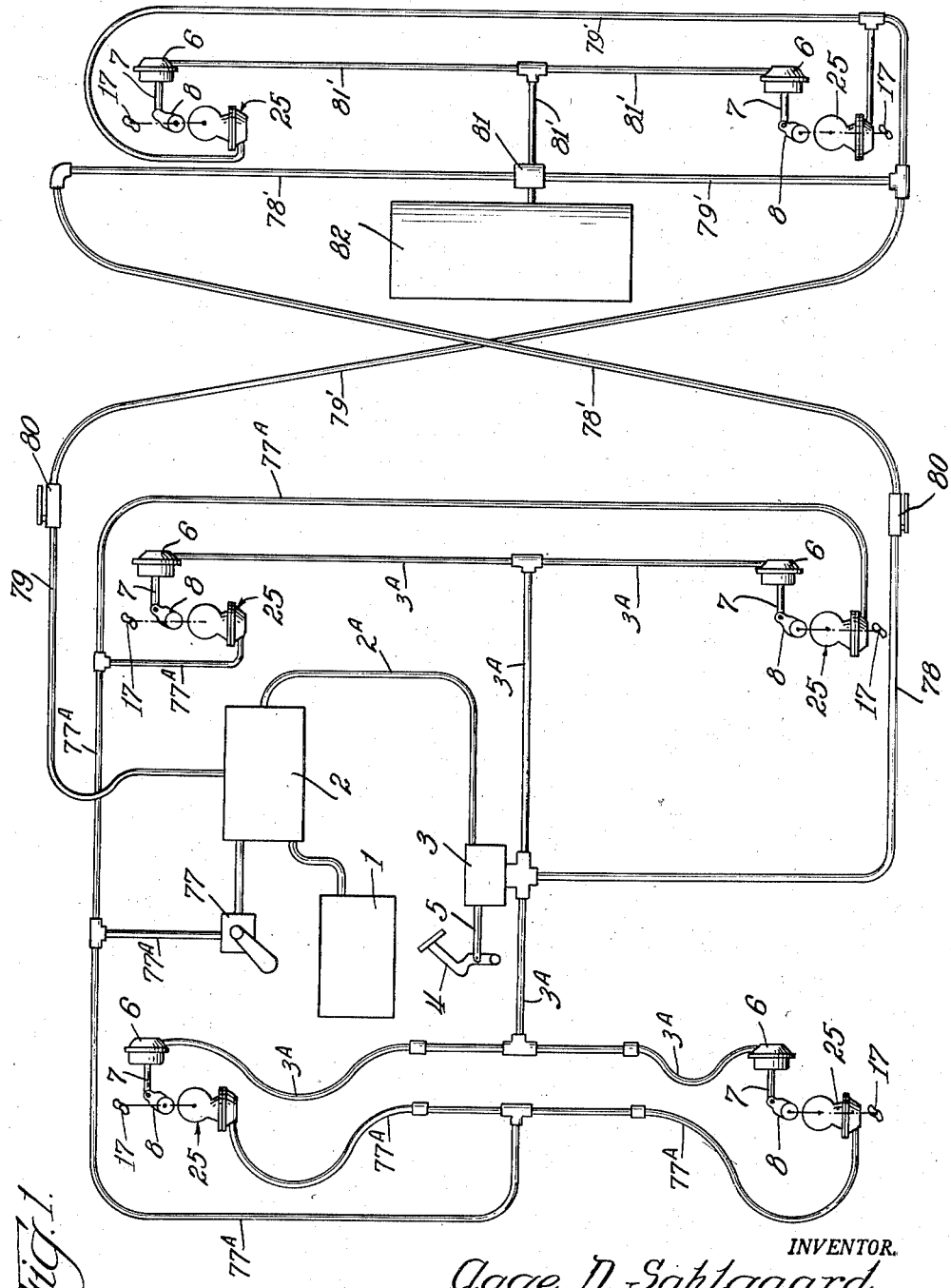
Fig. 1 is a schematic showing of the invention as applied to a tractor, bus or tractor-trailer combination.

Referring now to Fig. 1, reference numeral 1 indicates a source of either compressed air or vacuum, in the former case being a compressor in operative engagement with the vehicle motor and in the latter case the source of vacuum being the engine intake manifold. Element 1 is in communication through suitable piping with an air or vacuum reservoir 2 and suitable valve means (not shown) operates to retain in the latter a relatively constant supply of compressed air or vacuum.

A typical conventional brake operating mechanism will next be described for better understanding of the overall operation of the invention. The brake system about to be described is one commonly found on tractors, buses and trucks.

The air or vacuum reservoir 2 is in communication through suitable tubing 2A with a foot pedal operated valve 3 which is opened only during depressed position of the foot pedal 4 to which the operating lever 5 of valve 3 is articulated. Depression of foot pedal 4 opens up through suitable piping 3A the compressed air or vacuum stored in reservoir 2 to the plurality of brake chambers 6 each of which has piston-like means within it which is operative under compressed or atmospheric air pressure to move in proper direction the outwardly extending brake rod 7, one end of which is attached to the piston-like means for reciprocation therewith.

At its end opposite its connection to the piston-like means each brake rod 7 is connected to a slack adjuster 8 (Fig. 4), which has one or more holes 9 adjacent its outer end to receive the end of said brake rod. As shown in the broken lower portion of Fig. 4, each slack adjuster is bored out to receive a spiral gear 10, the inner and outer ends of which are cut down to form opposed axles 11, 12, respectively. Axle 12 extends outwardly of a screw cap 13 which is centrally bored to receive it. The outer end of axle 12 extends outwardly of screw cap 13 and is so shaped at 14 as to be capable of being turned with a wrench for adjustment of its position with respect to the hereinafter described parts which cooperate with it.

Spiral gear 10 is meshed with the teeth of another gear 15 and the latter is rigidly attached adjacent the outer end of a brake cam operating shaft 16, as particularly shown in Fig. 2. As shown in Figs. 2 and 3, at its end opposite to slack adjuster 8, shaft 16 carries a cam 17 which is medially positioned between the opposed free ends 18, 18 of a pair of generally semi-cylindrical brake shoes 20, 20 which have brake lining 21, 21 attached thereto along their outer peripheries. Each brake shoe is pivoted as at 22 to the brake drum 23 and a spiral tension spring 19 extends between the shoes 20, 20 to normally hold them out of contact with the out-turned annular inner braking side or rim 24 of brake drum 23. Brake drums 23 are attached to the vehicle wheels in conventional manner as shown in Fig. 2.

When foot pedal 4 is depressed, air or vacuum is released from tank 2 through the air or vacuum lines 2<sup>A</sup> and 3<sup>A</sup> shown in Fig. 1 to all the brake operating cylinders 6, and movement is thus imparted the piston-like means within such cylinders, imparting movement through brake rods 7 and slack adjusters 8 to brake cam operating shaft 16. Movement of each shaft 16 is imparted to cam 17, spreading brake shoes 20, 20 apart and putting brake linings 21, 21 into interior surface-contacting, frictional engagement with the annular rim 24 of brake drum 23, thereby applying a wheel-retarding braking force to each wheel.

Cam operating shaft 16 is normally supported for partial rotation by a bracket (not shown) which is mounted on the vehicle axle at a point between the brake drum 23 and the slack adjuster 8. In utilizing my invention I substitute for the conventional cam operating shaft support bracket the cam shaft or brake-locking means 25 shown in Figs. 2, 5 and 6 and hereinafter more fully described.

As hereinbefore mentioned, my device may be added as an accessory or may be conventional equipment. In the former case, the device 25 is preferably mounted on the axle by an axle encircling yoke 26 attached to the device by a neck portion 27, and in the latter case may be attached to a mounting integral with the conventional vehicle axle (not shown). The manner of mounting is relatively unimportant except that the cam operating shaft locking means must be rigidly attached to the vehicle axle to properly support the shaft 16 and otherwise properly operate in the manner hereinafter described.

Figure 5:
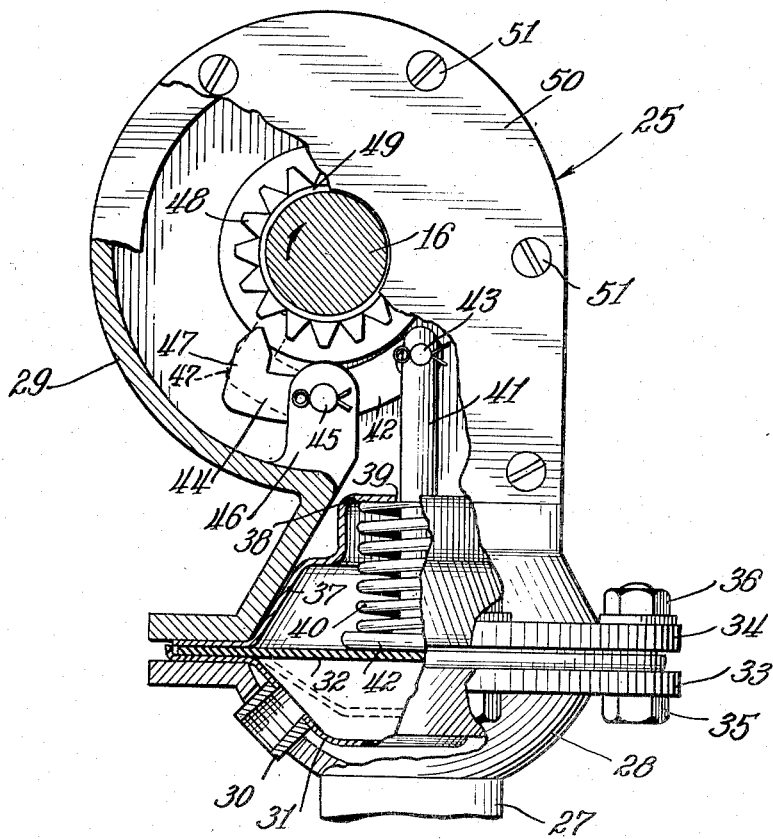
Fig. 5 is a diagrammatic side elevation, partially broken and partially in section, showing a typical form of brake locking means used in conjunction with a compressed air type braking system.

Referring now to Fig. 5, it will be seen that the cam operating shaft locking means therein shown comprises a lower outer housing 28 and an outer upper housing 29, the former being integral with neck 27. Lower outer housing 28 is dished out, as shown, to contain an inner lower housing 31 having a threaded air inlet 30 formed therein which extends outwardly through an opening in said housing 28 for connection to any one compressed air line shown in Fig. 1 as leading thereto. Inner lower housing 31 conforms generally to the shape of outer lower housing 28. Extending across the upper out-turned margins of lower housing 28 is an air impervious flexible diaphragm 32, the peripheral edges of which are impinged in air tight manner by the outwardly extending opposed annular lips 33, 34 of lower and upper outer housings 28, 29 respectively. The annular lips 33, 34 are held in air tight abutment with diaphragm 32 and inner lower housing 31 by appropriate fastening means such as bolts 35 to which are threaded conventional nuts 36. It will be obvious that, should it be desired, upper inner housing 37 and lower inner housing 31 could be dispensed with by redesigning upper housing 29 at its neck portion to have an integral annular shoulder similar to shoulder 38 to form an abutment for the upper end of spring 40.

When an air line 77<sup>A</sup> is attached to connection 30 there is formed between inner lower housing 31 and diaphragm 32 an air chamber which, under proper air pressure through the air line, causes diaphragm 32 to assume an upwardly extending generally horizontal expanded position such as shown in full lines in Fig. 5. In the absence of sufficient air pressure diaphragm 32 tends to collapse in the manner generally indicated in Fig. 5 by the dotted lines.

Still referring to Fig. 5, above diaphragm 32 is an upper inner housing 37 having formed thereon at its upper portion an annular shoulder 38 in which is formed a central opening 39. One end of a helical compression spring 40 abuts against the lower annular face of shoulder 38 and the other end of such spring abuts on the upper annular face of a head 42 of a vertically extending lever 41. The lower face of head 42 engages the upper face of diaphragm 32 for movement therewith under the urging of spring 40. The upper end of lever 41 extends through opening 39 in shoulder 38 and is connected to the end 42 of a dog or latch 44 by means of a stub shaft 43. A cotter key or similar fastening means prevents disengagement of stub shaft 43 from lever 41.

Dog 44 is medially pivoted on a stub shaft 45 to a bracket 46 preferably formed integral with upper outer housing 29 and a cotter key or other fastening means prevents disengagement of stub shaft 45 from dog 44 and bracket 46. At the free end of dog 44 is a hook 47, as shown, for engagement with the outwardly protruding peripheral teeth 48 of a collar 49 which is rigidly attached to cam operating shaft 16. Hook 47 is so shaped as to permit rotation of shaft 16 in the brake-setting direction shown by the arrow in Fig. 5 when engaged with teeth 48, but prevents rotation of such shaft in the opposite or brake-releasing direction unless disengaged in the manner hereinafter described. A covering plate 50, affixed to upper outer housing 29 by machine screws 51, permits access into said housing for repair or adjustment of the parts contained therein should it be required.

It will be obvious from the showing of Fig. 5 and the above description referring thereto that upon collapse of diaphragm 32 under lack of air pressure, lever 41 will be forced downwardly by the compression spring 40 and such movement will be transmitted through the linkage shown to dog 44, causing hook 47 to engage teeth 48. As previously set out, shaft 16 may still rotate in the one brake-setting direction but cannot move back into brake-releasing position until diaphragm 32 has been returned to generally horizontal position under air pressure.

Referring now to Fig. 6, the modified form of cam operating shaft locking means therein shown is a vacuum operated mechanism comprising a lower outer housing 52 in which is a lower inner housing 53 having a vacuum connection 54 which extends outwardly through an opening in housing 52 for connection to a vacuum line. A flexible diaphragm 56, held normally in depressed position by atmospheric air pressure on the side opposite that to which vacuum is applied, extends across the upper annular periphery 57 of lower outer housing 52. The lower annular peripheral edges 58 of the upper outer housing 61 assist in holding the marginal edges of diaphragm 56, impinging such marginal edges between them and the similar edges 57 of housing 52 by means of bolts 59 carrying the nuts 60. There is thus formed between inner lower housing 53 and diaphragm 56 a vacuum chamber, the normal air pressure above which normally holds said diaphragm in the depressed condition shown in full lines in Fig. 6.

Above diaphragm 56 is an inner upper housing 63 having an annular shoulder 64 formed at the upper part thereof. Medially of shoulder 64 is an opening 65 through which passes a lever 66 having a lower head portion 67 formed thereon. Head portion 67 is affixed to diaphragm 56 and a helical tension spring 68 is affixed at its one end to the upper surfaces of head portion 67 and at its other to the lower surfaces of shoulder 64 to constantly urge diaphragm 56 and lever 66 to resist the vacuum-withdrawn, normal condition of such diaphragm and to assume that position shown in dotted lines with respect to such parts.

At its outer end lever 66 is attached to the medial portion of a dog or latch 69 by a stub shaft 70. One end of dog 69 is fixed for limited vertical movement to a bracket 71 formed integral with upper outer housing 61 on stub shaft 72. To prevent displacement from the parts to which they are attached, stub shafts 70, 72 have cotter keys or other retaining means associated therewith. At the outer end of dog 69 is a hook 73 which, as shown by dotted lines in Fig. 6, is adapted to engage the peripheral teeth 48 of the collar 49, the latter being rigidly attached to brake cam operating shaft 16 in the same manner as that described with respect to the showing of Fig. 5, i. e., brake-setting rotation of shaft 16 is permitted but brake releasing rotation is effectively prevented when hook 73 is in engagement with teeth 48. A covering plate 74 affixed to upper outer housing 61 by machine screws 55 permits access into said housing for repair or adjustment of the parts contained therein should it be required.

From the above description it will be apparent that when a sufficient supply of vacuum is available in the chamber formed between lower inner housing 53 and diaphragm 56 such diaphragm will continue to assume that expanded condition shown in full lines in Fig. 6. However, the instant the vacuum is for any reason withdrawn spring 68 will withdraw coincident with collapse of diaphragm 56, bringing with it lever 66. This action will throw hook 73 into brake-locking engagement with teeth 48, locking the brakes in set condition in the manner hereinafter described, until vacuum is again restored to the unit.

Referring now to Fig. 7, there is shown therein a modification of the separate collar-with-peripheral-teeth arrangement (elements 49, 48, respectively, of Figs. 5 and 6) in that in this instance there are teeth 75 formed in the periphery of shaft 16 which are adapted for engagement by a hook 76 formed as an integral part of a dog such as that indicated by reference numeral 42 in Fig. 5 or that indicated by reference numeral 69 in Fig. 6. The arrangement shown in Fig. 7 is particularly adapted for use in instances wherein the invention is initially applied as an integral original part of a vehicle brake system.

Referring again to Fig. 1, the schematic showing therein may be taken as being applicable to either a self-contained unit such as a bus or truck, or as applicable to a tractor alone or as applicable to a combined connected tractor-trailer unit. By reference to the leftmost portion of this figure, wholly eliminating from consideration air lines 78, 79 and the remaining structure at the right of said figure there is illustrated a typical installation of the invention as applied to a truck or bus; by including air lines 78, 79 and shut-off valves 80, 80, application of the invention to a tractor disconnected from its trailer may be envisioned; and this figure taken in its entirety illustrates a connected-together tractor and trailer.

To the extent described in this paragraph the vehicle may be considered as being a truck or bus. It will be noted that a manually operable valve 77 is interposed in the air or vacuum lines 77A leading from air or vacuum storage tank 2 to each of the four brake actuating shaft locking means 25 shown as being associated with the tractor or bus braking system. Valve 77 is normally open thereby making accessible to the four brake-locking units 25 of the vehicle the full amount of compressed air or vacuum in tank 2. Upon being closed, valve 77 shuts off the supply of compressed air or vacuum and simultaneously opens up an exhaust port formed therein (not shown) to permit exhaust of air or vacuum from the lines therebeyond leading to brake-locking devices 25. When valve 77 is closed the diaphragms 32 (or 56) collapse and the hooks such as those shown in Figs. 5, 6 or 7 are permitted to engage the teeth (48 or 75) associated with the brake cam operating shafts 16. This, of course, will not of itself set the brakes, but they may be then set in conventional manner by depressing foot pedal 4. However, irrespective of whether the service brakes are set by the conventional means previous to, simultaneously with or subsequent to closure of valve 77 (since one-way, brake locking movement of shaft 16 may be had even in the engaged position of the hooks and teeth) the brakes will then be locked in set position and will remain so until disengaged in the manner hereinafter set out.

The foregoing description of the manner of locking the brakes of a truck or bus is equally applicable to a tractor from which the trailer is purposely detached subsequent to closure of shut-off cocks or valves 80, 80, as hereinafter described.

Still referring to Fig. 1, it will be noted that a so-called "service" air or vacuum line 78, 78' leads from foot pedal operated valve 3 to an emergency relay valve 81 on the trailer. Any suitable conventional emergency relay valve, herein diagrammatically illustrated and designated by numeral 81, may be employed, as for example, the relay valve shown in Figs. 6 and 7 of Patent No. 2,451,139 or the relay valve shown in Figs. 2 and 3 of Patent No. 2,380,507. A so-called "emergency" air or vacuum line 79, 79' leads from normally open communication with the air or vacuum tank side of the line to said relay valve 81. When the emergency line is directly connected to air or vacuum tank 2 by air line 79, 79' in the manner shown on the drawings, closure of valve 77 will be effective for brake locking purposes only upon the tractor brakes in the manner described above. However, when the trailer emergency line connection is made to the lines beyond valve 77, as indicated by the dotted line connection designated 79', closure of valve 77 will be effective to cause operation of all the brake operating shaft locking means associated with both tractor and trailer, permitting all the brakes of both units to be set and locked simultaneously.

Under the conditions outlined above, brake locking means 25 will then effectively hold the brakes in set position. Reopening of valve 77 in the presence of a built-up supply of air pressure will reexpand the diaphragms of units 25, causing the parts associated therewith to assume inoperative, non-locking position. Deactivation or release of the brake locking units is sometimes facilitated, after build-up of air or vacuum pressure in the lines, by reapplication of the conventional brake-setting means, this tending to "loosen up" the entire brake setting and locking mechanism.

Both the trailer service brake and emergency brake lines are each provided with a shut-off cock or valve 80 which valves are normally open when a trailer is attached to the tractor and which are manually closed when the trailer is detached in the usual course of handling.

As mentioned hereinabove, both the service air or vacuum line 78, 78' and the emergency air or vacuum line 79, 79' are in communication with an emergency relay valve 81. Emergency relay valve 81 serves to cause the build-up, during normal operations, of a reserve of compressed air or vacuum in trailer emergency air or vacuum tank 82 and also functions to assure that the conventional service brakes are operated simultaneously with and by air pressure or vacuum released by foot pedal operated valve 3 when the trailer is connected to a tractor.

However, in the event that pressure in the tractor air or vacuum tank should fall below a predetermined safe service-brake-operating level, or in the event that the emergency line 79 (or 79') were broken, as, for instance, by accidental or purposeful disconnection of the trailer from the tractor, the emergency relay valve 81 will operate to pass through line 81' to trailer brake operating cylinders 6 the stored compressed air or vacuum from trailer emergency air or vacuum tank 82, thereby immediately setting the brakes. As indicated hereinbefore, the brakes will remain set under air pressure or vacuum alone as long as a sufficient supply of air or vacuum continues to be available in tank 82.

It will be noted that the air or vacuum lines leading to those brake cam shaft locking units 25 associated with the trailer are in open communication with the emergency air or vacuum line 79. Thus, immediately upon failure of this line to carry adequate pressure the diaphragms of the units 25 will collapse causing the internal elements to engage the teeth on the brake cam shaft. The brakes will thus be set by the conventional brake operating means and will be locked in set position until the locking units are deactivated by return of pressure or vacuum to them by reconnection to a properly operative conventional brake system.

Having described my invention in considerable detail, I do not wish to be limited to the exact forms shown and described, realizing that modifications thereof will be apparent to those skilled in the art, except as I may be limited by the scope of the appended claim.

I claim:

In a brake system for a tractor and trailer vehicle, a brake-operating system for the tractor comprising individual brake-operating means for singularly operating the brakes of each wheel, air pressure differential creating means, an air storage tank on said tractor containing air in stored condition maintained at a differential from atmospheric pressure, conduit means communicating between said tank and each of said brake-operating means, normally closed valve means in the line of said conduit means operable at will and when open passing to said brake-operating means air from said tank to actuate said brake-operating means and thereby actuate individually but simultaneously the brakes on each wheel, a brake-locking mechanism associated with each individual brake-operating means, other conduit means in normally open communication between said tank and said brake-locking mechanisms, means in said brake-locking mechanisms inhibiting them from acting to lock the brakes during continued maintenance of open communication between said brake-operating means and said tank, and valve means in the line of said other conduit means operable at will for interrupting the maintenance of air at a differential from atmospheric pressure in said brake-locking means, thereby causing said brake-operating means to be actuated while said air pressure differential creating means may continue in operation for the continued build-up and maintenance of air at a differential to atmospheric pressure in said tank, and a brake-operating system for the trailer, including individual brake-operating means for each trailer wheel, a brake-locking mechanism associated with each of said individual trailer wheel brake-operating means, including conduit extension means for said first mentioned tractor conduit means extending beyond said normally closed valve means, extension conduit means on said trailer extending from said tractor air storage tank, a reserve air storage tank on said trailer auxiliary to said tractor air storage tank, and an air control relay valve on said trailer, said tractor conduit means communicating with said air control valve means and therethrough with said brake-operating means of said trailer, said extension conduit means of said trailer communicating with said relay valve and with each trailer brake-locking mechanism, said reserve air storage tank also communicating with said air control relay valve, and said air control relay valve being adapted under working conditions to maintain a relatively constant supply of air in said reserve air storage tank at a differential to atmospheric pressure and to discharge air therefrom as required for boosting the brake applying force made available through said tractor normally closed valve means and for completely setting the brake-operating means and brake-locking mechanisms should air at a differential to atmospheric pressure be unavailable from said tractor storage tank.

AAGE D. SAHLGAARD.

REFERENCES CITED

The following references are of record in the file of this patent:

UNITED STATES PATENTS

| Number | Name | Date |
| --- | --- | --- |
| 1,823,588 | Christenson | Sept. 15, 1931 |
| 2,121,366 | Robinson | June 21, 1938 |
| 2,138,386 | Miller | Nov. 29, 1938 |
| 2,380,507 | Eaton | July 31, 1945 |
| 2,451,139 | Williams | Oct. 12, 1948 |